United States Patent
Awad

(10) Patent No.: US 11,340,617 B1
(45) Date of Patent: May 24, 2022

(54) THERMALLY REGULATED AUTONOMOUS MOTION BY AUTONOMOUS MOBILE DEVICE

(71) Applicant: AMAZON TECHNOLOGIES, INC., Seattle, WA (US)

(72) Inventor: Nadim Awad, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 284 days.

(21) Appl. No.: 16/516,831

(22) Filed: Jul. 19, 2019

(51) Int. Cl.
  *G05D 1/02* (2020.01)

(52) U.S. Cl.
  CPC ......... *G05D 1/0214* (2013.01); *G05D 1/0223* (2013.01); *G05D 1/0231* (2013.01)

(58) Field of Classification Search
  CPC ... G05D 1/0214; G05D 1/0223; G05D 1/0231
  See application file for complete search history.

(56) References Cited

U.S. PATENT DOCUMENTS

| | | | | |
|---|---|---|---|---|
| 9,821,461 B1* | 11/2017 | Urata | ............... | B62D 57/032 |
| 10,220,954 B2* | 3/2019 | Sun | ............... | B64C 39/024 |
| 2011/0107037 A1* | 5/2011 | Yoshida | ............... | G06F 11/3089 |
| | | | | 711/154 |
| 2014/0156073 A1* | 6/2014 | Zhang | ............... | G05D 1/0022 |
| | | | | 700/257 |
| 2014/0249695 A1* | 9/2014 | Gettings | ............... | G05D 1/0022 |
| | | | | 701/2 |
| 2017/0240046 A1* | 8/2017 | Vik | ............... | B62D 49/06 |
| 2019/0091874 A1* | 3/2019 | Hayashi | ............... | B25J 9/1664 |
| 2020/0225655 A1* | 7/2020 | Cella | ............... | G06N 3/0472 |
| 2020/0334887 A1* | 10/2020 | Salfity | ............... | G05D 1/0251 |
| 2020/0348662 A1* | 11/2020 | Cella | ............... | G05B 23/024 |
| 2021/0157312 A1* | 5/2021 | Celia | ............... | G05B 23/0294 |

* cited by examiner

*Primary Examiner* — Bhavesh V Amin
(74) *Attorney, Agent, or Firm* — Lindauer Law, PLLC

(57) ABSTRACT

Without human intervention, an autonomous mobile device (AMD) uses motors to move through a physical space along a path, controlled by computing devices processing sensor data from sensors. Electrical components such as the motors and computing devices generate heat during operation. The heat generated by the motors depends on time of operation and how hard they are being driven. The more data the computing devices process, the greater the heat generated. An overheated component may protectively shut down or fail. Internal temperature is used to constrain AMD movement. The AMD path may be planned to avoid overheating along the way and avoid arriving too hot to complete an expected or scheduled task at the destination. Speed along the path may be less than maximum speed, and the amount of data sent to the computing devices is also reduced, reducing heat generation and allowing the electrical components time to cool off.

20 Claims, 7 Drawing Sheets

THERMAL PERFORMANCE DATA 138

PROCESSING THERMAL DATA 402

| AMBIENT TEMPERATURE 404 | 70 | | | | |
|---|---|---|---|---|---|

| DEVICE TEMPERATURE (DEGREES F) 406 | SPEED (M/S) 408 | RESPONSE TIME (MILLISECONDS) 410 | DATA TRANSFER RATE (MEGABITS/SECOND) 412 | PROCESSOR POWER DISSIPATION (W) 414 | PREDICTED TEMPERATURE INCREASE/MIN 416 |
|---|---|---|---|---|---|
| 75 | 0.8 | 75 | 57 | 8 | 0.01 |
| 75 | 1.2 | 50 | 77 | 18 | 0.29 |
| 80 | 1.1 | 55 | 72 | 15 | 0.23 |
| 85 | 1.0 | 60 | 67 | 12 | 0.20 |
| 90 | 0.9 | 65 | 62 | 10 | 0.19 |
| 95 | 0.8 | 70 | 57 | 9 | 0.18 |

MOTOR THERMAL DATA 418

| DISTANCE (METERS) 420 | SPEED (M/S) 422 | ESTIMATED MOTOR POWER DISSIPATION (W) 424 | PREDICTED TEMPERATURE INCREASE/MIN 426 |
|---|---|---|---|
| 10 | 1.2 | 5.0 | 0.15 |
| 10 | 1 | 4.7 | 0.11 |
| 10 | .8 | 4.1 | 0.9 |

TASK THERMAL DATA 428

| TASK 430 | ESTIMATED TOTAL POWER DISSIPATION (W) 432 | PREDICTED TEMPERATURE INCREASE/TASK 434 |
|---|---|---|
| PRESENT VIDEO CALL | 37 | 1.9 |
| PRESENT AUDIO CALL | 7 | 0.3 |
| SENTRY PATROL | 49 | 3.7 |

FIG. 4

| PATH PLAN 142(1) | | | |
|---|---|---|---|
| PATH PORTION 502 | DISTANCE (METERS) 504 | SPEED (M/S) 506 | PREDICTED TEMPERATURE INCREASE 508 |
| 1 | 1.16 | 1.2 | 1.8 |
| 2 | 1.22 | 0.8 | 1.6 |
| 3 | 1.21 | 1.2 | 1.9 |
| | | TOTAL 510 | 5.3 |

| PATH PLAN 142(2) | | | |
|---|---|---|---|
| PATH PORTION 502 | DISTANCE (METERS) 504 | SPEED (M/S) 506 | PREDICTED TEMPERATURE INCREASE 508 |
| 4 | 1.67 | 1.2 | 2.6 |
| 5 | 2.54 | 0.8 | 3.3 |
| | | TOTAL 510 | 5.9 |

THERMALLY REGULATED AUTONOMOUS MOTION BY AUTONOMOUS MOBILE DEVICE

BACKGROUND

An autonomous mobile device (AMD) moves throughout a physical space. During operation, it is advantageous to avoid overheating of the AMD.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 4 illustrates data associated with thermal regulation of motion, according to some implementations.

Figure 1:
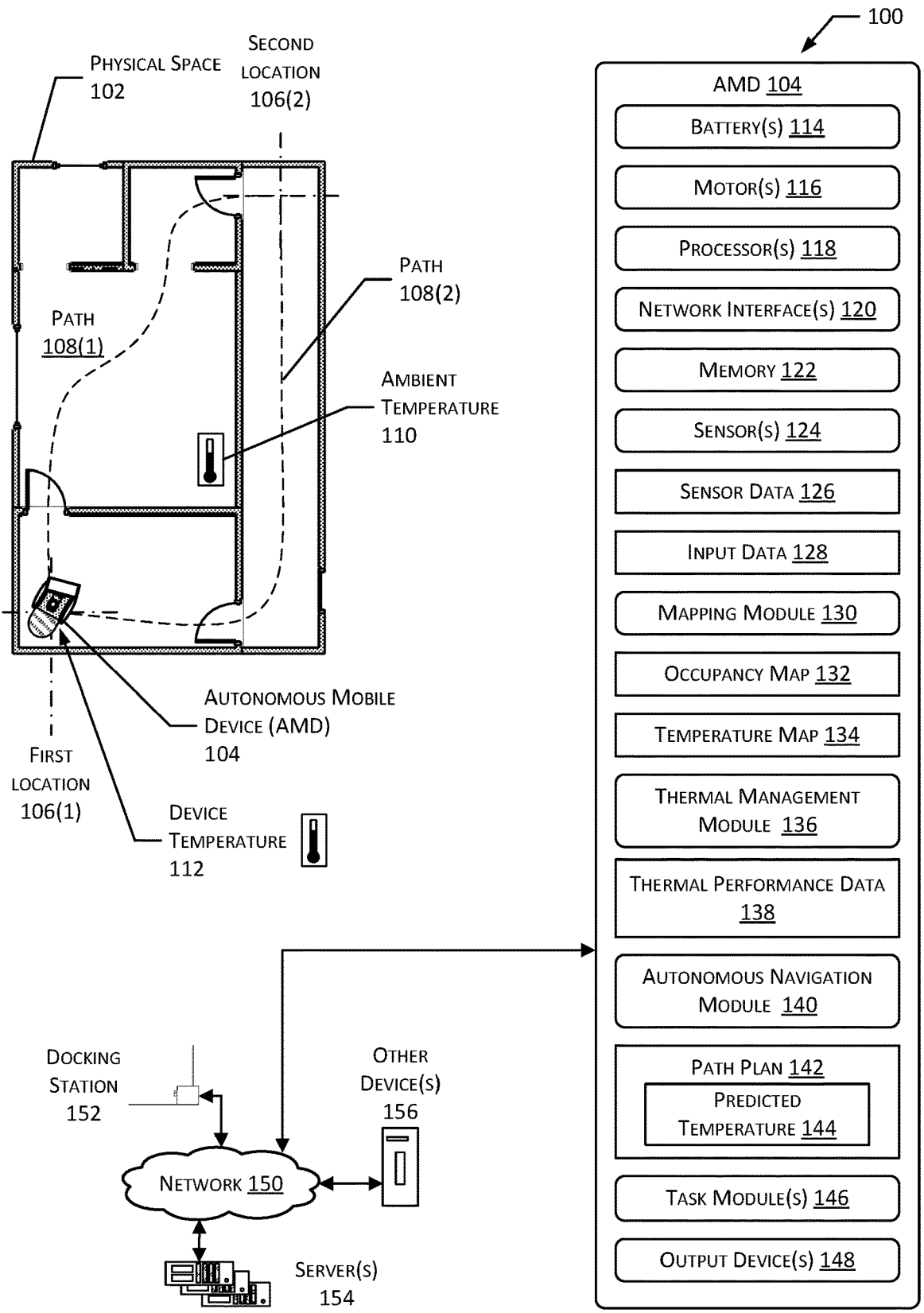
FIG. 1 illustrates a system for thermally regulated autonomous motion by an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may be commanded to perform sentry tasks involving moving through rooms in the physical space.

Sensors on the AMD or in the physical space acquire sensor data. The sensor data is processed to determine information such as a current location of the AMD in the physical space, an occupancy map indicative of obstacles in the physical space, and so forth. While moving within the physical space the AMD should avoid collisions with obstacles. For example, the AMD should avoid colliding with obstacles such as furnishings, walls, people, falling down stairs, and so forth.

The sensor data is transferred to one or more hardware processors (processors) for processing. For example, the sensor data may comprise images acquired by a camera. The images may be processed to identify objects in those images, determine landmarks used to determine a location of the AMD, and so forth. In another example, the sensor data may comprise point cloud data generated by a LIDAR unit, indicative of distances from a sensor to various points in the physical space.

Electrical energy is used to operate various components of the AMD, including the one or more processors, motors, sensors, memory, and so forth. During operation, these components generate as heat at least some of the electrical energy used to operate them. For example, a processor may generate heat as it processes sensor data. In another example, a motor transforms some electrical energy to mechanical energy in the form of movement and some electrical energy into heat.

As the amount of energy used to operate a component increases, so too does the heat produced by that component. For example, a processor may produce 10 watts of heat while processing sensor data at a rate of 10 megabits per second (mbps), and produce an increased 29 watts of heat while processing sensor data at a rate of 15 mbps. As more data is processed, more electrical power is consumed and more heat is produced. Likewise, as the speed, torque, operating time, and so forth of a motor is increased, so too does the heat produced by that motor.

If the temperature of a component rises above a threshold value, operation of the component may be affected. The component may have internal circuitry that decreases the performance of the component or shuts the component down due to high temperature. For example, a system on a chip (SoC) processor may have thermal protection circuitry controlled by a temperature sensor associated with the SoC processor. If the temperature sensor indicates that the SoC processor temperature is above a first threshold temperature, the SoC processor may reduce clock frequency. The reduction in clock frequency may reduce the amount of sensor data which can be processed per unit time. As a result, the AMD may no longer be able to process sensor data quickly enough to operate autonomously and provide a desired reaction time. For example, the motors may be able to move the AMD faster than the temperature-limited processors are able to process the sensor data and control the motors.

If the temperature of the component is above a second threshold temperature, the component may shut down entirely to avoid damage due to overheating. Continuing the example, the SoC processor could overheat and turn off until sufficient heat has been dissipated and the SoC processor has cooled to below the second threshold temperature.

Removing the heat produced by components in the AMD may involve several techniques. A passive cooling system transfers heat from a component to the ambient environment without using energy or active components. For example, a heat sink on the SoC processor may transfer heat from the SoC processor to the air in contact with the heat sink.

A rate of heat transfer from a component to the ambient environment may be increased by using an active cooling system. For example, a fan may be installed that moves air from the ambient environment past the heat sink. In other implementations, a liquid cooling system may pump a coolant liquid past the components to transfer heat from the components and through a radiator where heat is transferred to the ambient environment. In still another implementation, the Peltier effect may be used to electronically move heat from one location to another on a thermoelectric cooling device.

An active cooling system adds complexity and mass to a device and also consumes electrical power. For example, the entire device may need to be engineered to provide ducts for air to move or tubes for coolant to flow. The consumption of power by the active cooling system may leave less electrical power for use by other systems, reducing operational run time. In comparison a passive cooling system does not consume electrical power and may have less mass, less complexity, produce no noise, and so forth.

An active cooling system may also impair the operation of sensors on the AMD. For example, acoustic noise produced by a fan moving air or a pump moving a fluid in an active cooling system may interfere with the operation of a microphone used to detect sounds, such as user speech.

The AMD dissipates excess heat into the ambient environment using one or more of an active cooling system or a passive cooling system. However, if the amount of heat generated is reduced, then the size and complexity of these cooling systems may be correspondingly reduced or eliminated.

Described in this disclosure are techniques for thermally regulating autonomous motion. A temperature of one or more components, such as the SoC processor, is measured by a temperature sensor. If the AMD is directed to move from a first location to a second location, a path plan is determined. The path plan may take into consideration the temperature of the one or more components, and determine a predicted temperature at a specific point, such as along the path or at the second location.

In one implementation different paths may be compared, and the path which results in the lowest predicted temperature at the second location may be chosen. For example, a temperature increase may be determined based on the length of the path, length of time the AMD will move at a particular speed, heat produced by the processor(s) to process sensor data to enable movement at the particular speed, and so forth.

In another implementation, the path plan may specify a first speed of the AMD along at least a portion of the path that is less than a maximum speed available. While travelling at the first speed, the AMD is moving more slowly, and thus is moving through the physical space more slowly. As the AMD is moving through the physical space more slowly, a reaction time of the AMD is increased. The reaction time is the interval between acquisition of sensor data and the AMD responding to the sensor data. For example, moving at half the maximum speed gives twice as much time for the AMD to determine if an obstacle is present, determine where the AMD currently is, and so forth.

A temperature value may be used to determine one or more of speed or data transfer rate, which is then used to determine one or more of data transfer rate or speed. For example, an actual temperature of the SoC processor of the AMD at a given time may be used to select a speed. Based on the speed a maximum data transfer rate of sensor data sent to the SoC processor may be determined. In another example, the actual temperature may be used to select a maximum data transfer rate. Based on the maximum data transfer rate, a speed may be determined. In other examples a predicted temperature may be used.

Limiting the rate at which sensor data is sent to or used by the processor for processing limits the heat dissipated by the processor. A reduction in the amount of data, such as sensor data, processed by the processor thus reduces the amount of electrical energy consumed by the processor and subsequently dissipated as heat. Transfer of data may be limited prior to reaching the processor, or may be limited prior to processing by one or more cores of the processor.

Various techniques may be used individually or in conjunction with one another to control the rate at which data is transferred to or processed by the processor. In one implementation, the frame rate of an image sensor in a camera may be changed from a first frame rate of 30 frames per second (fps) to a second frame rate of 15 fps. This reduces by half the image data sent to the processor. In another implementation, at least a portion of the data from a sensor may be discarded. For example, every other frame from the image sensor may be dropped upon receipt at the processor. In another implementation a subset of data may be selected to send to or to use by the processor. For example, an image may be cropped and a selected portion of that image may be processed while the remaining portion of the image is discarded. In yet another implementation resolution of a sensor may be changed. For example, the image sensor may be directed to change from outputting images with a first resolution of 1920×1080 pixels to a second resolution of 1024×768. In still another implementation, other parameters of a sensor may be adjusted or the sensor data may be modified. For example, the image sensor may be directed to transition from providing images with a bit depth of 10 bits to 8 bits, an encoder connected to a microphone may be directed to transition from 16 bits to 12 bits, and so forth.

In some implementations the path plan may also take into consideration the task expected to be performed upon arrival at the second location. For example, if the AMD has been summoned to perform a particular task, the temperature of the AMD upon arrival needs to be such that the AMD is able to perform the task without a thermal shutdown or other adverse event. The path plan may limit the speed of the AMD and the data transfer rate, such that the predicted temperature of the AMD upon arrival at the second location is low enough to permit performance of the task.

By using the techniques described in this disclosure, the AMD is able to manage the production of heat such that the amount of cooling needed is reduced while maintaining adequate reaction time to obstacles in the physical space. This reduction in the amount of cooling needed to maintain the internal temperature of the AMD allows for a mechanically simpler, more robust, quieter, and less costly device. The management of heat production may allow the AMD to avoid an active cooling system or utilize a relatively small active cooling system. This reduces the noise of the AMD and reduces power consumption, improving the operational run time between recharging. The resulting reduction of internal heat production within the device also reduces local or regional hotspots within the device by allowing time for heat to dissipate into the ambient environment. As a result, components within the AMD are exposed to lower overall temperatures and potentially damaging high temperatures are avoided. This may improve the longevity of the individual components and the AMD overall.

Illustrative System

FIG. 1 illustrates a system 100 for thermally regulated autonomous motion in a physical space 102 by an autonomous mobile device (AMD) 104, according to some implementations.

The AMD 104 is located at a first location 106(1) and may move to a second location 106(2) along a path 108. One or more obstacles may be present within the physical space 102. For example, obstacles may comprise walls, furnishings, one or more users, and so forth. While moving from the first location 106(1) to the second location 106(2), the AMD 104 needs to determine where it is at a given time, determine the location of obstacles, and move while avoiding collisions with any of these obstacles. The command to move may be the result of an input from the user, a previously scheduled task, responsive to input from one or more sensors, a command from an external computing device, or another source.

An ambient temperature 110 is a temperature of at least a portion of the physical space 102. The ambient temperature 110 may be measured by one or more sensors in a room, a sensor in air handling equipment, a sensor on the AMD 104, and so forth. For example, a wall thermostat that manages a heating and air conditioning system for the house may include a thermometer and produce data indicative of the ambient temperature 110. In some situations, the ambient temperature 110 of different locations within the physical space 102 may vary.

A device temperature 112 is a temperature of at least a portion of the AMD 104. The device temperature 112 may be measured by one or more sensors 124 of the AMD 104. In one implementation the sensor may comprise a thermocouple that is integrated into a processor 118. In another implementation the sensor 124 may comprise a temperature sensor that is affixed to a heat sink. In some situations, the device temperature 112 may be determined for different points within the AMD 104. For example, device temperature 112 may be determined using sensors on a processor 118, motor 116, and so forth.

The AMD 104 may include a battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth.

During use, a user may issue a command. For example, the user may provide speech input by uttering the command "robot, come here". In another example, the user may indicate the command using a computing device, such as a smartphone or tablet computer. Data indicative of the command may then be provided to the AMD 104.

The AMD 104 may include one or more hardware processors 118 (processors) configured to execute one or more stored instructions. The processors 118 may comprise one or more cores. The processors 118 may include microcontrollers, systems on a chip (SoC), field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include thermometers, microphones, cameras, LIDAR, and so forth. The sensors 124 may generate sensor data 126. The sensors 124 are discussed in more detail with regard to FIG. 3.

During operation the AMD 104 may determine input data 128. The input data 128 may include or be based at least in part on sensor data 126 from the sensors 124 onboard the AMD 104. In one implementation, a speech processing module may process raw audio data obtained by a microphone on the AMD 104 and produce input data 128. For example, the user may say "robot, come here" which may produce input data 128 "come here".

A mapping module 130 generates an occupancy map 132 that is representative of the physical features in the physical space 102. For example, the sensors 124 may comprise one or more cameras that obtain sensor data 126 comprising image data of the physical space 102. The image data may be processed to determine the presence of obstacles. The occupancy map 132 may comprise data that indicates the location of one or more obstacles, such as a table, wall, stairwell, and so forth. In some implementations, the occupancy map 132 may comprise a plurality of cells with each cell of the plurality of cells representing a particular area in the physical space 102. Data may be stored that indicates whether a cell contains an obstacle. An obstacle may comprise an object or feature that prevents or impairs traversal by the AMD 104. For example, an obstacle may comprise a wall, stairwell, and so forth. Cells that have an obstacle value above a threshold value that is indicative of containing an obstacle may be deemed to not be traversable by the AMD 104. Cells that have obstacle values less than the threshold value may be deemed traversable by the AMD 104.

The occupancy map 132 may be manually or automatically determined. For example, during a learning phase the user may take the AMD 104 on a tour of the physical space 102, allowing the AMD 104 to generate the occupancy map 132 and associated data, such as tags designating a particular obstacle type, such as "furniture" or "fragile". In another example, during subsequent operation, the AMD 104 may generate the occupancy map 132 that is indicative of locations and types of obstacles such as chairs, doors, stairwells, and so forth as it moves unattended through the physical space 102.

Modules described herein, such as the mapping module 130, may provide various processing functions such as de-noising, filtering, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

In some implementations a temperature map 134 may be determined. The temperature map 134 may provide information such as the temperature associated with a particular location within the physical space 102. The temperature map 134 may be determined using one or more of sensor data 126 from sensors 124 in the physical space 102, on the AMD 104, and so forth. For example, the AMD 104 may receive ambient temperature 110 data from sensors in the physical space 102 at known locations, which is used to determine the temperature map 134 that is indicative of historical temperature data. In another example, a thermometer onboard the AMD 104 may measure the ambient temperature 110 and, combined with information about the location of the AMD 104 at the time the ambient temperature 110 was measured, may be used to determine the temperature map 134.

In some implementations the temperature map 134 may comprise information that is indicative of a temperature change per unit time for a particular region or portion of the physical space 102. For example, the temperature map 134 may indicate that, while moving in the living room, the AMD 104 previously experienced a temperature increase of 0.5 degrees F. per minute of autonomous movement through the living room. The temperature change per unit time of movement may vary due to the characteristics of the region. For example, a first region which has a flooring of thick carpeting may move more slowly and use more energy to move compared to a second region with hardwood flooring.

A thermal management module 136 constrains operation of one or more components in the AMD 104 to manage the production of heat due to operation of those one or more components. The constraints may be applied as a result of current conditions such as the current ambient temperature 110, the current device temperature 112, and so forth. These constraints may include one or more of limiting a speed of a motor 116, limiting how long the motor 116 is operated, limiting a data transfer rate of sensor data 126 sent to one or more processors 118 or processed by those one or more processors 118, and so forth. Thermal performance data 138 may also be used by the thermal management module 136. The thermal performance data 138 provides information about predicted temperature increases due to operation of the one or more components of the AMD 104. The thermal performance data 138 is discussed in more detail with regard to FIG. 4. The thermal management module 136 may accept as input one or more of sensor data 126 indicative of the ambient temperature 110, the device temperature 112, and so forth.

An autonomous navigation module 140 provides the AMD 104 with the ability to navigate within the physical space 102 without real-time human interaction. The autonomous navigation module 140 may implement, or operate in conjunction with the other modules described herein, such as the thermal management module 136.

The AMD 104 includes an autonomous navigation module 140 that generates a path plan 142 that is indicative of a path 108 through the physical space 102 from the first location 106(1) to the second location 106(2). The AMD 104 may then begin moving along the path 108. In some implementations, the autonomous navigation module 140 may generate a plurality of path plans 142. Individual ones of the path plans 142 may describe different paths 108, designate different speeds for moving along different portions of the path 108, and so forth. The thermal management module 136 may operate in conjunction with the autonomous navigation module 140.

While moving along the path 108, the AMD 104 may generate sensor data 126 from the sensors 124. The sensor data 126 is processed to assess the physical space 102, determine obstacles, and update or change the path 108 as appropriate to avoid the obstacles and reach the second location 106(2). For example, if an obstacle appears in the path 108, the mapping module 130 may determine the presence of the obstacle. The autonomous navigation module 140 may then plan an alternative path 108 to the second location 106(2). This may result in a modification of the path plan 142 currently in use, or generation of a new path plan 142. The autonomous navigation module 140 is discussed in more detail with regard to FIG. 2.

In one implementation, if the device temperature 112 is greater than a first threshold value, the thermal management module 136 may limit the data transfer rate of sensor data 126 to the processor(s) 118. By reducing the data transfer rate, and the corresponding quantity of data being processed by the processor(s) 118, the processor(s) 118 will consume less electrical power and produce less heat. A maximum speed of the AMD 104 may be reduced to correspond with the reduced data transfer rate. For example, as the data rate is reduced, the maximum speed of the AMD 104 is reduced to allow sufficient processing time for the AMD 104 to respond to obstacles or other aspects of the physical space 102. The reduction in the maximum speed may also facilitate cooling of the AMD 104 by reducing the heat produced by operation of the motor 116.

In another implementation, the thermal management module 136 may operate using a predicted temperature 144. The path plan 142 may be associated with a predicted temperature 144. One or more of the thermal management module 136 or the autonomous navigation module 140 may use a proposed path plan 142 to determine a predicted temperature 144 of the AMD 104 at a particular point on the path 108, such as at the second location 106(2). For example, the autonomous navigation module 140 may provide information associated with the path plan 142 to the thermal management module 136 which, based on the thermal performance data 138 and the path plan 142, determines a predicted temperature 144. The predicted temperature 144 may be used by the autonomous navigation module 140 to select a particular path plan 142 from several possibilities, as a trigger to generate an alternative path plan 142, or other action. For example, a path plan 142 may be selected that has the lowest predicted temperature 144 at the second location 106(2), or which has a lowest maximum predicted temperature 144 at a point along the path 108.

The AMD 104 may utilize one or more task modules 146. The task module 146 comprises instructions that, when executed, provide one or more functions. The task modules 146 may perform functions such as finding a user, following a user, presenting output on output devices 148 of the AMD 104, perform sentry tasks by moving the AMD 104 through the physical space 102 to determine the presence of unauthorized people, and so forth.

Performance of a task may involve the use of one or more components of the AMD 104, which in turn may result in the production of heat. The thermal management module 136 may be used to determine a predicted temperature 144 associated with performance of a task. In some implementations, one or more of the device temperature 112 or the predicted temperature 144 may be used to determine whether the task can be completed at a particular time, or constrain the performance of the task. For example, if the predicted temperature 144 associated with completion of a task would exceed a threshold value, the AMD 104 may either provide output from an output device 148 indicating that the task cannot be completed at that time, or may perform the task more slowly. Continuing the example, the speed at which the AMD 104 moves to follow the user may be reduced, along with the data transfer rate, to reduce the production of heat while following the user. Where possible, the thermal management module 136 may perform a task so long as that task can be completed with a minimum threshold level of performance. Continuing the earlier example, the minimum speed for a "follow me" task may be 0.8 m/s. If the thermal management module 136 determines that the AMD 104 is not able to maintain that minimum speed due to a predicted temperature 144 exceeding the threshold value, the AMD 104 may not perform the task.

In some implementations the path plan 142 determined by the autonomous navigation module 140 may take into consideration the task expected to be performed upon arrival at the second location 106(2). The AMD 104 will also need to arrive at the second location 106(2) with a low enough device temperature 112 that it is able to perform the expected task. For example, if the AMD 104 has been summoned to a perform a particular task, the device temperature 112 of the AMD 104 upon arrival needs to be such that the AMD 104 is able to perform the task without a thermal shutdown or other adverse event. Continuing the example, the sum of the device temperature 112 on arrival plus the predicted temperature increase of the task 434 needs to be below a threshold value.

The path plan 142 determined may be arranged such that that the predicted temperature 144 of the AMD 104 upon arrival at the second location 106(2) is low enough to permit performance of the task. For example, the path plan 142 determined for use by the AMD 104 may have a path 108 that traverses a cooler area of the physical environment 102 as indicated by the temperature map 134, may travel at a lower speed to reduce heat production, and so forth.

The AMD 104 includes one or more output devices 148, such as one or more of a motor 116, light, speaker, display, projector, printer, and so forth. The one or more output devices 148 may be used to provide output during operation of the AMD 104. The output devices 148 are discussed in more detail with regard to FIG. 3.

The AMD 104 may use the network interfaces 120 to connect to a network 150. For example, the network 150 may comprise a wireless local area network, that in turn is connected to a wide area network such as the Internet.

The AMD 104 may be configured to dock or connect to a docking station 152. The docking station 152 may also be connected to the network 150. For example, the docking station 152 may be configured to connect to the wireless local area network 150 such that the docking station 152 and the AMD 104 may communicate. The docking station 152 may provide external power which the AMD 104 may use to charge the battery 114.

The AMD 104 may access one or more servers 154 via the network 150. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 154 for further processing. The servers 154 may process the spoken audio and return to the AMD 104 data that may be subsequently used to operate the AMD 104.

The AMD 104 may also communicate with other devices 156. The other devices 156 may include one or more devices that are within the home or associated with operation of one or more devices in the home. For example, the other devices 156 may include a thermostat, doorbell camera, a garage door opener, a refrigerator, washing machine, and so forth. In some implementations the other devices 156 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
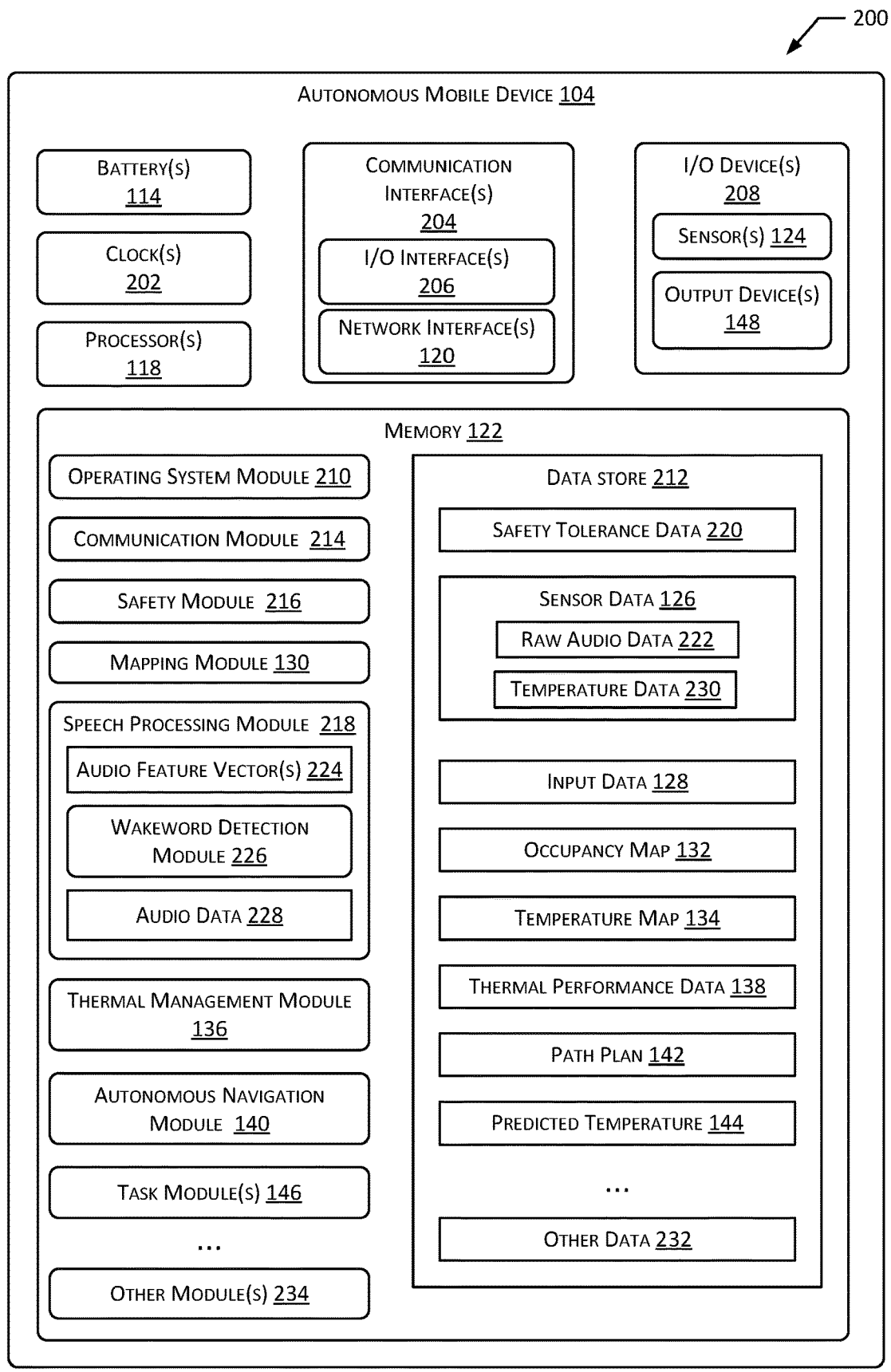
FIG. 2 is a block diagram of the components of the AMD, according to some implementations.

FIG. 2 is a block diagram 200 of the components of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 126, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 156 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 148 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 156 such as other AMDs 104, docking stations 152, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 156 including other AMDs 104, servers 154, network attached storage devices, and so forth.

A communication module 214 may be configured to establish communication with other devices 156, such as other AMDs 104, an external server 154, a docking station 152, and so forth. The communications may be authenticated, encrypted, and so forth.

Other modules within the memory 122 may include a safety module 216, the mapping module 130, a speech processing module 218, the thermal management module 136, the autonomous navigation module 140, the one or more task modules 146, or other modules 234. The modules may access data stored within the data store 212, including safety tolerance data 220, sensor data 126, temperature data 230, other data 232, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The speech processing module 218 may be used to process utterances of the user. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 150 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 154 for speech processing. The audio data 228 corresponding to audio obtained by the microphone may be processed locally on one or more of the processors 118, sent to a server 154 for routing to a recipient device or may be sent to the server 154 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before sending to the server 154.

The speech processing module 218 may include or access an automated speech recognition (ASR) module. The ASR module may accept as input raw audio data 222, audio feature vectors 224, or other sensor data 126 and so forth and may produce as output the input data 128 comprising a text string or other data representation. The input data 128 comprising the text string or other data representation may be processed to determine the command to be executed. For example, the utterance of the command "robot, come here" may result in input data 128 comprising the text string "come here". The wakeword "robot" may be omitted from the input data 128.

The thermal management module 136 constrains operation of one or more components in the AMD 104 to manage the production of heat due to operation of those one or more components. For example, the thermal management module 136 may limit data transfer of sensor data 126 to the processor(s) 118. The limitation of transfer includes, but is not limited to, transfer of data to input circuitry of the processor(s) 118, the transfer of data to one or more cores within the processor(s) 118, and so forth. In one example, the data transfer may be limited by preventing data from being sent to the processor 118. In another example, the data transfer may be limited by preventing data from being processed by a core in the processor 118. During operation, the thermal management module 136 may use various inputs. These may include, but are not limited to, the sensor data 126, input data 128, the occupancy map 132, the temperature map 134, the thermal performance data 138, the path plan 142, the predicted temperature 144 for a path plan 142, the predicted temperature 144 associated with performance of a task, and so forth which may be stored in the data store 212.

The autonomous navigation module 140 provides the AMD 104 with the ability to navigate within the physical space 102 without real-time human interaction. The autonomous navigation module 140 may implement, or operate in conjunction with, the mapping module 130 to determine the occupancy map 132, the temperature map 134, or other representation of the physical space 102. In one implementation, the mapping module 130 may use one or more simultaneous localization and mapping ("SLAM") techniques. The SLAM algorithms may utilize one or more of maps, algorithms, beacons, or other techniques to navigate. The autonomous navigation module 140 may use the occupancy map 132 to determine a set of path plans 142 that include possible paths 108 along which the AMD 104 may move. One of these path plans 142 may be selected and used to move the AMD 104. For example, a possible path 108 that is the shortest, has the fewest turns, or the lowest predicted temperature 144 on arrival, may be selected and used. The selected path plan 142 is then used to determine a set of commands that drive the motors 116 connected to the wheels. For example, the autonomous navigation module 140 may determine the first location 106(1) within the physical space 102 and determine a path 108 to the second location 106(2), and the speed of the AMD 104 at various portions of the path 108.

The autonomous navigation module 140 may utilize various techniques during processing of sensor data 126. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 126, and so forth. For example, an external server 154 may send a command that is received using the network interface 120. This command may direct the AMD 104 to proceed to find a particular user, follow a particular user, and so forth. The AMD 104 may then process this command and use the autonomous navigation module 140 to determine the directions and distances associated with carrying out the command. For example, the command to "come here" may result in a task module 146 sending a command to the autonomous navigation module 140 to move the AMD 104 to a particular location near the user and orient the AMD 104 in a particular direction.

The AMD 104 may connect to the network 150 using one or more of the network interfaces 120. In some implementations, one or more of the modules or other functions described here may execute on the processors 118 of the AMD 104, on the server 154, or a combination thereof. For example, one or more servers 154 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a user is able to understand.

The data store 212 may store the other data 232 as well. For example, localization settings may indicate local preferences such as language, user identifier data may be stored that allows for identification of a particular user, and so forth.

Figure 3:
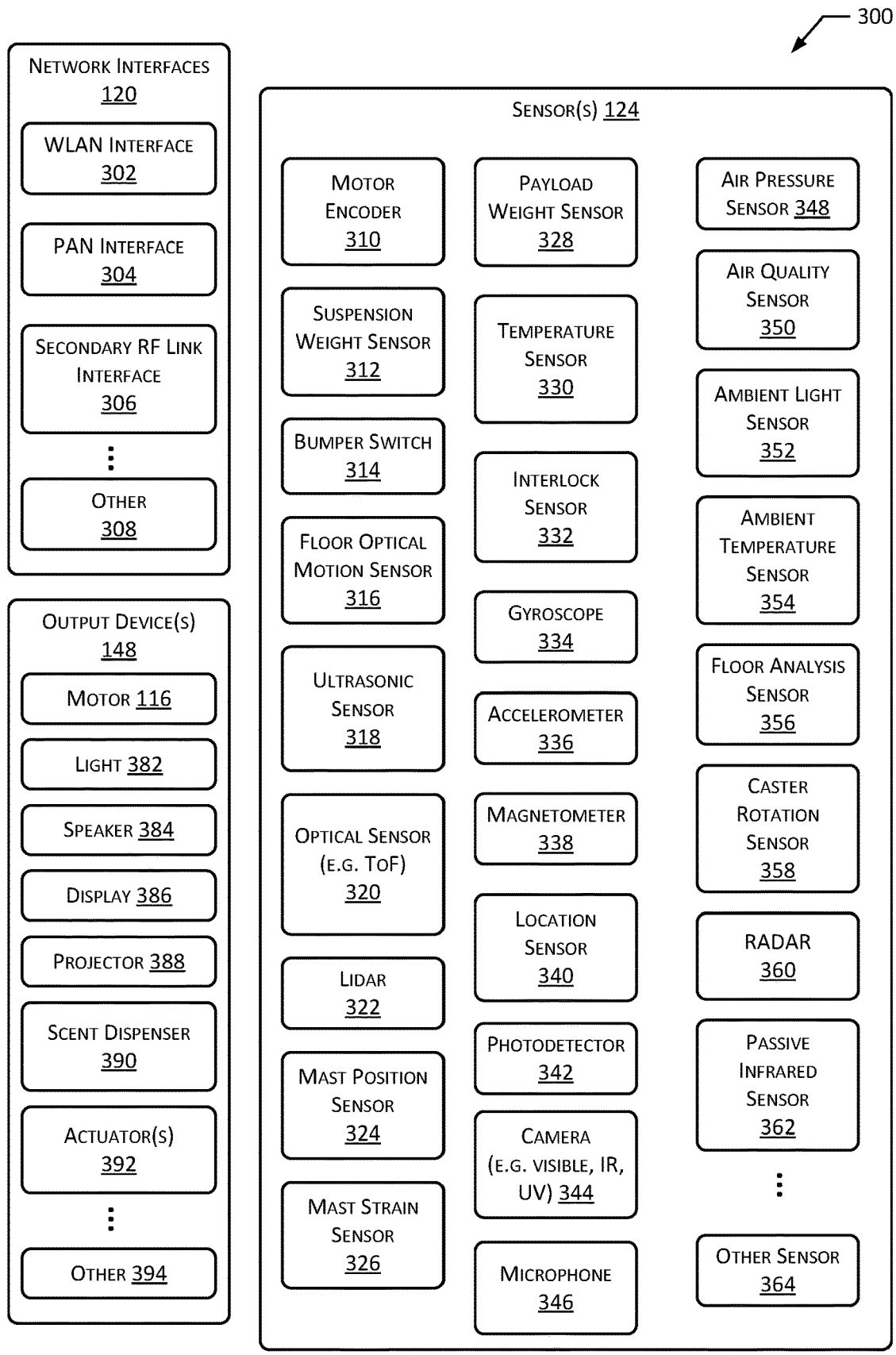
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 148, according to some implementations. The components illustrated here are provided by way of illustration and not necessarily as a limitation. For example, the AMD 104 may utilize a subset of the particular network interfaces 120, output devices 148, or sensors 124 depicted here, or may utilize components not pictured. One or more of the sensors 124, output devices 148, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 156 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 152, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 140 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual light sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 140 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 140 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more temperature sensors 330 may be utilized by the AMD 104. The temperature sensors 330 provide temperature data of one or more components within the AMD 104. For example, a temperature sensor 330 may indicate a temperature of one or more the batteries 114, one or more motors 116, and so forth. In the event the temperature exceeds a threshold value, the component associated with that temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 126 comprising images being sent to the autonomous navigation module 140. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 140 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 140, the task module 146, and so forth. For example, if the floor analysis sensor 356 determines that the floor is wet, the safety module 216 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR sensor 362 may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 140. One or more touch sensors may be utilized to determine contact with a user or other objects.

The AMD 104 may include one or more output devices 148. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

In some implementations, a sensor 124 may include a computing device or elements thereof. For example, a camera 344 may include an image sensor, a processor, memory, and so forth. Continuing the example, the computing device of the camera 344 may process the output of the image sensor. The data transfer rate of the data transfer from the image sensor or as processed by the computing device in the camera 344 may be changed as described in this disclosure.

FIG. 4 illustrates thermal performance data 138 that may be used by the thermal management module 136, according to some implementations. While the thermal performance data 138 is described in tabular form, other data structures may be used.

The thermal performance data 138 may include processing thermal data 402. The processing thermal data 402 is indicative of the predicted temperature increase of one or more processors 118 or related components due to operation of the AMD 104 under various conditions, including a given ambient temperature 404. Heat production by the motors 116 is described below with regard to the motor thermal data 418. The ambient temperature 404 may affect heat transfer between the AMD 104 and the ambient environment. For example, if the ambient temperature 404 is 60 degrees F., the AMD 104 will dissipate heat more rapidly into the environment than if the ambient temperature 404 is 80 degrees F.

The processing thermal data 402 may be indicative of one or more of a device temperature 406, a speed 408 of travel of the AMD 104, a response time 410 associated with the speed, a data transfer rate 412, processor power dissipation 414, a predicted temperature 416, and so forth. The device temperature 406 may be associated with the device temperature 112 before an action such as performing a task or autonomous movement begins. The speed 408 indicates a maximum speed at which the AMD 104 may move given the associated conditions and a requirement to react within the response time 410. The response time 410 indicates a maximum amount of time that the AMD 104 has to respond to the sensor data 126. For example, if an object appears in the path 108 of the AMD 104, the AMD 104 should detect and begin reacting to that object within the response time. As the speed 408 of the AMD 104 increases, the response time 410 decreases. Likewise, if the AMD 104 moves more slowly, the response time 410 increases. The data transfer rate 412 is representative of a maximum amount of sensor data 126 or other data that is to be sent to or processed by the one or more processors 118. As described above, as the rate at which the processor 118 processes data increases, so too does the amount of power produced by the processor 118 as heat. The processor power dissipation 414 indicates the amount of electrical energy dissipated by the processor 118. The predicted temperature increase 416 is indicative of a predicted temperature increase, such as degrees F. per minute given the other conditions.

By using the processor thermal data 402, the thermal management module 136 is able to determine the predicted temperature 144 under various conditions. For example, with an ambient temperature of 404 of 70 degrees F., and if the AMD 104 reports a device temperature 112 of 85 degrees F., the recommended maximum speed 408 is 1.0 m/s, at which speed a maximum data transfer rate 412 of 67 mbps is recommended and the predicted temperature increase 416 in those conditions of a component such as a processor 118 would be 0.20 degrees F. per minute of operation.

The thermal management module 136 may use the thermal performance data 138 in various ways. For example, a device temperature 406 in the thermal performance data 138 that corresponds to the device temperature 112 may be looked up in the processing thermal data 402 and used to determine a maximum data transfer rate 412, maximum speed 408 that can be supported by the maximum data transfer rate 412, or combinations thereof.

The thermal management module 136 may use the thermal performance data 138 in combination with information about a particular path plan 142 or task to determine the predicted temperature 144. In one implementation, the following equation may be used to determine the predicted temperature 144:

$$\text{Predicted Temperature} = ((\text{Distance}/\text{Speed})/60)(\text{Predicted Temperature Increase}/\text{min}) + \text{Initial Device Temperature} \quad \text{EQUATION 1}$$

For example, if the path plan 142 involves the AMD 104 travelling 10 meters at 1.2 m/s through a physical space 102 with an ambient temperature of 70 F and the device temperature 112 initially is 75 F, the predicted temperature 144 after travelling 10 meters is 75.04 F. In other implementations, other algorithms may be used.

The thermal performance data 138 may include motor thermal data 418. The motor thermal data 418 provides information about heat production associated with operation of the one or more motors 116. In the implementation depicted here, the motor thermal data 418 may specify for a given distance 420 at a given speed 422, an estimated motor power dissipation 424 and a predicted temperature increase 426 per unit of time. In other implementations, other data may be used. For example, the motor thermal data 418 may specify a predicted temperature increase 426 per second of operation at a given temperature. In some situations the predicted temperature increase 426 may vary. For example, the motor 116 may provide additional torque to move through a thick carpet. As a result, the predicted temperature increase 426 may be greater than that associated with moving across a smooth wood floor. In some implementations the motor thermal data 418 may provide information associated with different types of flooring, locations in the physical space 102, and so forth.

The thermal performance data 138 may include task thermal data 428. The task thermal data 428 provides information about heat production associated with performance of a particular task 430. For example, the tasks 430 may include presenting a video call, presenting an audio call, sentry patrol, and so forth. For a given task 430, the task thermal data 428 may provide one or more of an estimated total power dissipation 432, predicted temperature increase 434 for that task 430, and so forth.

In some implementations the task thermal data 428 may comprise a predicted temperature increase per task 434 per unit of time. For example, for every minute a sentry patrol task takes place, the task thermal data 428 may indicate a predicted temperature increase 434 of 0.2 F. In other implementations, the task thermal data 428 may comprise a predicted temperature increase for an entire task, for an average task, for the average task associated with the particular user ordering the task, and so forth.

In some implementations the information associated with a predicted temperature 144 increase may be consolidated into a single data structure, equation, model, and so forth. For example, an overall predicted temperature 144 increase per unit time or distance may be determined given a particular speed.

Figure 5:
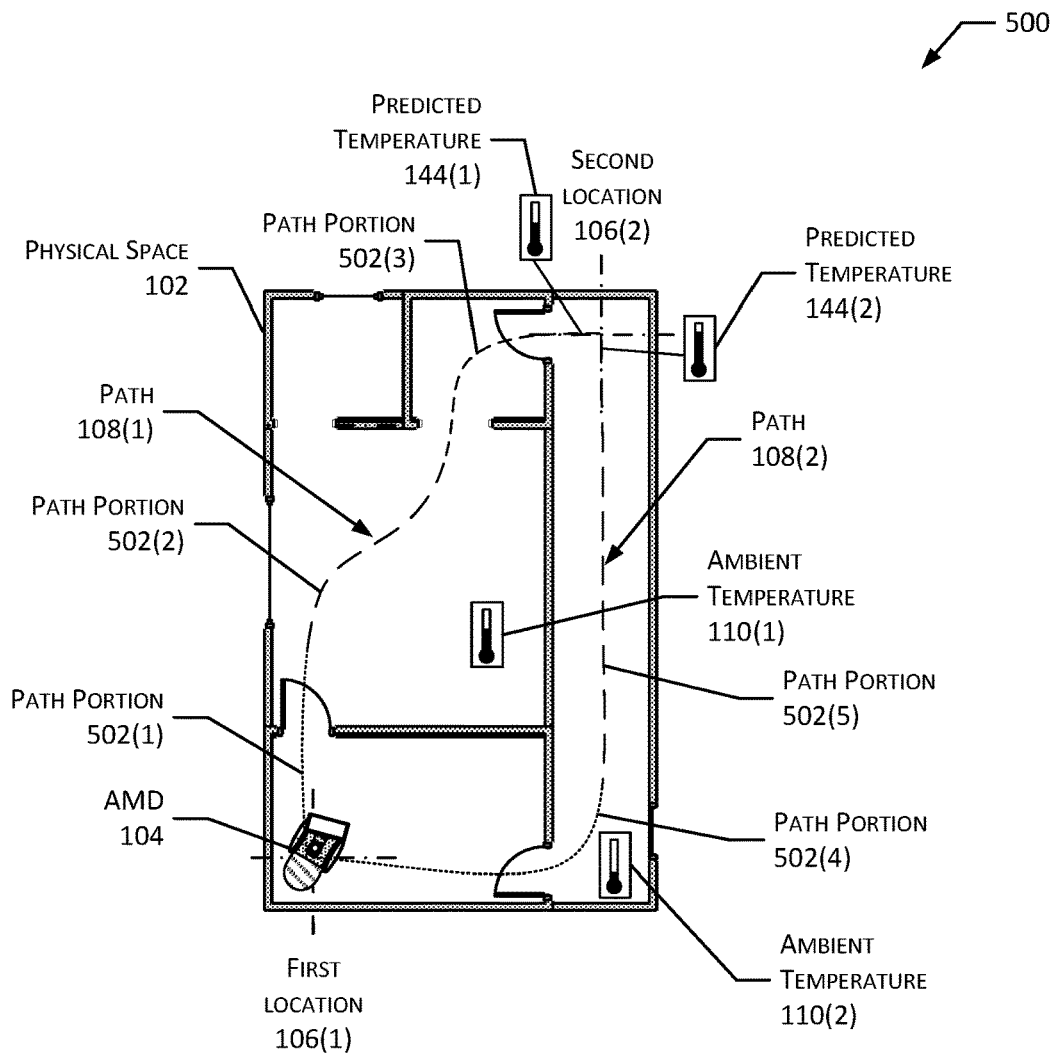
FIG. 5 illustrates possible path plans through a physical space and associated temperature increases, according to some implementations.

FIG. 5 illustrates possible path plans through a physical space 102 and associated temperature increases, according to some implementations. As described above, the AMD 104 may move autonomously from a first location 106(1) to a second location 106(2). There may be more than one path 108 from the first location 106(1) to the second location 106(2) in the physical space 102. For example, a first path 108(1) and a second path 108(2) are depicted.

As described above, the autonomous navigation module 140 may determine one or more path plans 142. The path plan 142 describes a particular path 108 through the physical environment 102. The path 108 described in the path plan 142 may include one or more path portions 502. For example, a path portion 502 may comprise a series of waypoints, set of movement instructions, and so forth. Different path portions 502 may have different speeds associated with them. For example, a first path portion 502(1) may have a first planned speed and a second path portion 502(2) may have a second planned speed. The actual speed of the AMD 104 while following the path plan 142 may vary. For example, if a user ahead of the AMD 104 is walking more slowly than the planned speed, the AMD 104 would slow down as well and avoid collision with the user.

Shown here are a first path plan 142(1) and a second path plan 142(2). The path plan 142 describes, for a particular path portion 502, a distance 504 of that path portion 502 and a predicted temperature increase 508 at the end of that path portion 502. Also shown is a total 510 predicted temperature increate 508. To determine the predicted temperature 144 for a particular path plan 142, the total 510 may be added to the device temperature 112 prior to movement of the AMD 104.

The path plans 142 may include a predicted temperature 144. For example, the path plan 142 may include a predicted temperature 144 of the AMD 104 upon arrival at the second location 106(2). In another example, the path plan 142 may include predicted temperatures 144 at various times. For example, the path plan 142 may include a maximum predicted temperature expected along the path 108, a predicted temperature 144 at the end of the path portion 502, and so forth. In some implementations, the autonomous navigation module 140 may determine more than one path plan 142 that follow the same path 108 but with different speeds in the respective path portions 502 along that same path 108.

In this illustration, the first path 108(1) has a first predicted temperature 144(1) at the second location 106(1) that is less than the second predicted temperature 144(2) of the second path 108(2). In some implementations, the autonomous navigation module 140 may use the predicted temperature 144 to select the path plan 142 to be used. For example, the first path 108(1) may be selected as it has a lower predicted temperature 144(1) at the second location 106(2).

Figure 6:
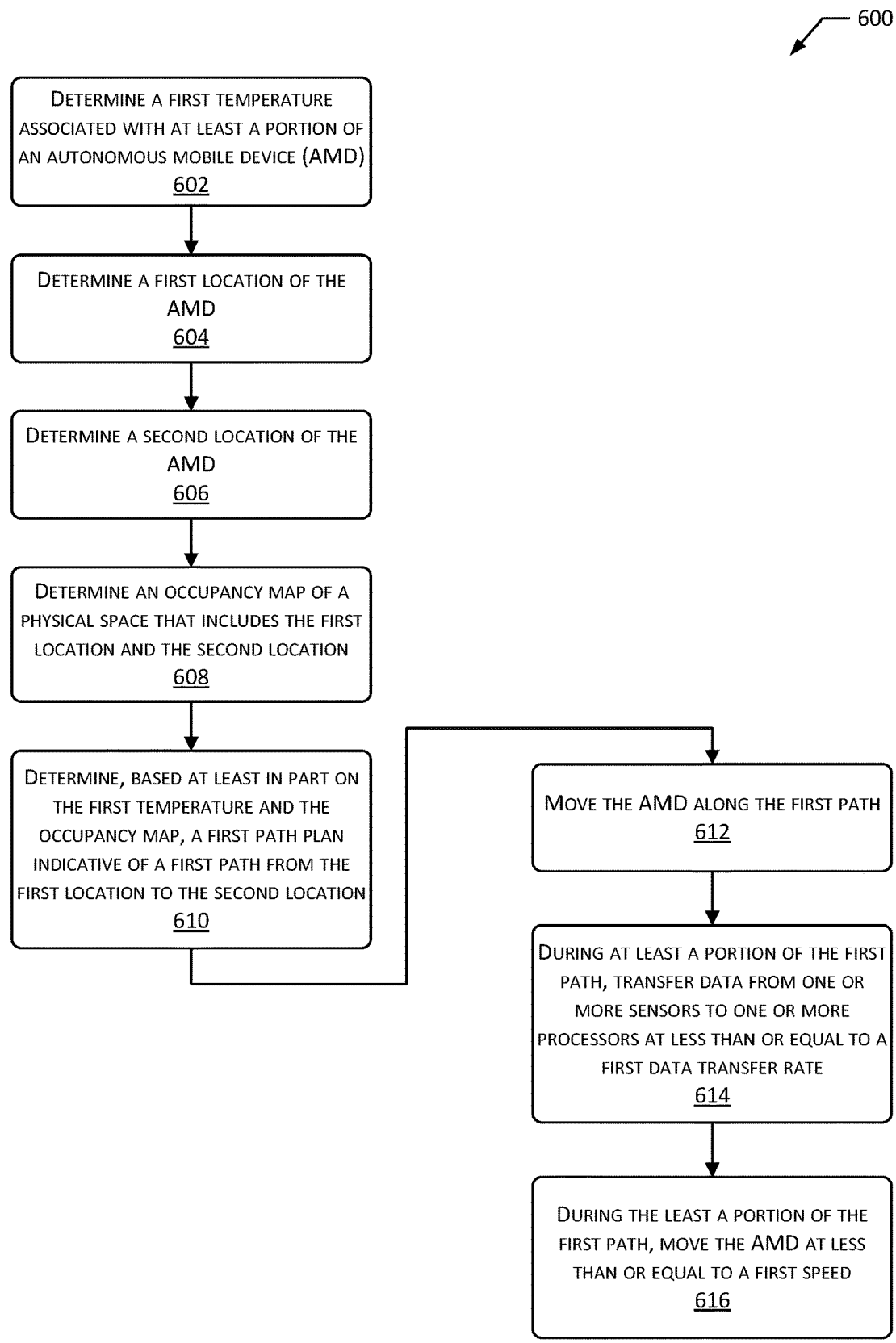
FIG. 6 is a flow diagram of a process for determining a path plan for the AMD to travel based on temperature, according to some implementations.

FIG. 6 is a flow diagram 600 of a process for determining a path plan 142 for the AMD 104 to travel based on temperature, according to some implementations. The process may be implemented at least in part by one or more of the thermal management module 136, the autonomous navigation module 140, and so forth.

At 602 a first temperature associated with at least a portion of the AMD 104 is determined. For example, the device temperature 112 may be determined by a thermocouple of a processor 118.

At 604 a first location 106(1) of the AMD 104 is determined. For example, the autonomous navigation module 140 may use sensor data 126 to determine where in the physical space 102 the AMD 104 is currently located.

At 606 a second location 106(2) of the AMD 104 is determined. For example, the second location 106(2) may comprise a destination that the AMD 104 has been instructed to proceed to. For example, the user may issue a command to the AMD 104 "go to the hallway" or "follow me" or "find Bob". In another example, the command to determine the second location 106(2) may be determined by the AMD 104 or an external device such as the server 154.

At 608 an occupancy map 132 of the physical space 102 is determined that includes the first location 106(1) and the second location 106(2). For example, the sensor data 126 may be used to determine the location of obstacles in the physical space 102.

At 610, based at least in part on the first temperature and the occupancy map 132, a first path plan 142 is determined that is indicative of a first path 108 from the first location 106(1) to the second location 106(2). For example, the autonomous navigation module 140 may determine several candidate path plans 142. Each candidate path plan 142 may comprise a candidate path 108.

Data associated with the candidate path plans 142 and their respective candidate paths 108 may be used by the thermal management module 136 to determine a predicted temperature 144 upon arrival at the second location 106(2). For example, the thermal management module 136 may use the thermal performance data 138 to determine for a particular path portion 502 with a particular distance 504 and speed 506, the predicted temperature increase 508 for that path portion 502. By summing the predicted temperature increases 508 of the path portions 502, a predicted temperature 144 for the path plan 142 may be determined.

The autonomous navigation module 140 may use this data to select the path plan 142 that results in the lowest predicated temperature 144. If the predicted temperature 144 exceeds a threshold value, another path plan 142 may be used. For example, a path plan 142 that has a lower speed 506 for one or more path portions 502 may be used. With the lower speed, a lower data transfer rate 412 may be used, reducing heat production.

In some implementations the temperature map 134 may be used to determine the first path plan 142. For example, the autonomous navigation module 140 may determine that the first path 108 traverses a first area which is indicated by the temperature map 134 as being 5 degrees cooler than a second area which is traversed by a second path 108. Time spent in the cooler area may be used to reduce the device temperature 112 of the AMD 104. At least in part because of the lower temperatures encountered along the first path 108, the first path 108 may be selected. In some implementations, the path portion 502 that traverses a portion of an area with a temperature less than a threshold value may have a lower speed, allowing time for the AMD 104 to dissipate heat and cool down.

At 612 the AMD 104 moves along at least a portion of the first path 108.

At 614 during at least a portion of the first path 108, transfer data from one or more sensors 124 to the one or more processors 118 at less than or equal to a first data transfer rate. For example, if the first path plan 142 that was determined includes a second portion 502(2) with a speed of 0.8 meters/second (m/s), the data transfer rate 412 needed to maintain the desired responsiveness of the AMD 104 is 57 megabits/second, or vice versa. While traversing the first portion 502(1) of the first path plan 142, the data transfer rate 412 of sensor data 126 to the one or more processors 118 is constrained to not exceed 57 mbps.

At 616, during the at least a portion of the first path 108, the AMD 104 is moved at less than or equal to a first speed 506. For example, the first speed 506 may comprise the maximum speed 408 indicated by the processing thermal data 402 that is associated with the data transfer rate 412. With respect to moving the AMD 104 the maximum speed it is capable of at all times, the reduction in speed that results in a reduction in the needed data transfer rate 412, or the reduced data transfer rate 412 that results in a reduction in speed, reduce the heat produced by the one or more processors 118 or other components. As a result, the device temperature 112 along the path 108, or upon arrival at the second location 106(2), may be kept below a threshold value and preventing overheating of the AMD 104.

Figure 7:
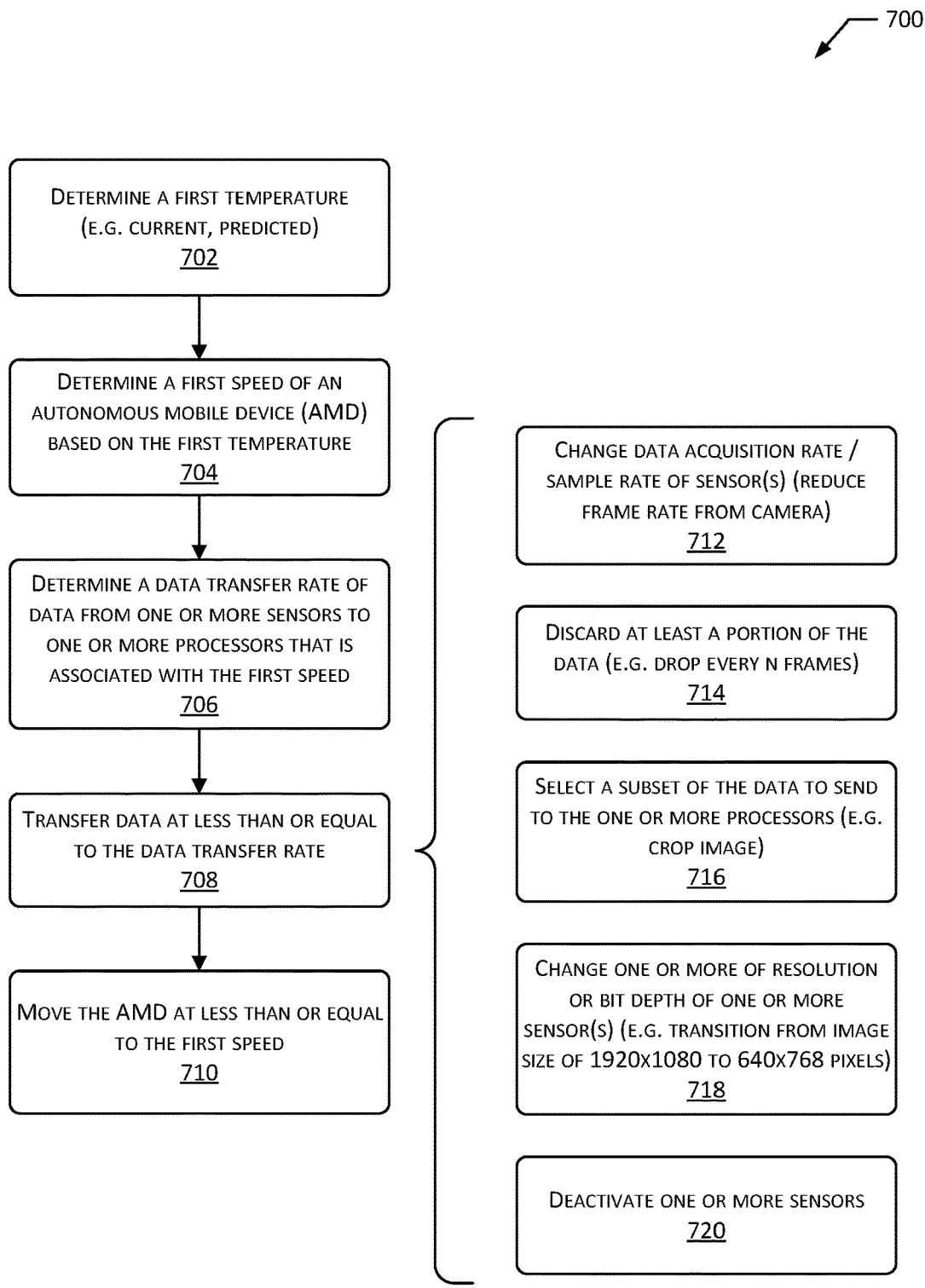
FIG. 7 is a flow diagram of a process for regulating temperature by limiting the AMD to a particular speed during movement and limiting data transfer to a processor in the AMD commensurate with the speed, according to some implementations.

FIG. 7 is a flow diagram 700 of a process for regulating temperature by limiting the AMD 104 to a particular speed during movement and limiting data transfer to one or more processors 118 in the AMD 104 commensurate with the speed, according to some implementations. The process may be implemented at least in part by one or more of the thermal management module 136, the autonomous navigation module 140, and so forth.

At 702 a first temperature is determined. For example, this may be the device temperature 112 or a predicted temperature 144.

At 704 a first speed of the AMD 104 is determined based on the first temperature. Continuing the example, the thermal management module 136 may use the device temperature 112 and the processing thermal data 402 to determine the speed 408.

At 706 a data transfer rate from one or more sensors 124 to one or more processors 118 is determined that is associated with the first speed. Continuing the example, the thermal management module 136 may use the device temperature 112 and the processor thermal data 402 to determine the maximum data transfer rate 412 that is associated with the speed 408.

At 708 data is transferred at less than or equal to the data transfer rate 412. This constraint on data transfer may be on data transferred to the one or more processors 118, or may be a constraint on the data actually processed by the one or more processors 118. For example, a total quantity of sensor data 126 sent to an input of the processor 118 may be reduced to the data transfer rate 412. In another example, a total quantity of sensor data 126 processed by the processor 118 may be reduced to the data transfer rate 412. Continuing this example, the processor 118 may receive the sensor data 126 at a first data transfer rate, such as 100 mbps, but may discard or disregard data and process the remaining data at a lower rate, such as 50 mbps.

The data transfer rate may be specific to particular one or more of the processors 118. For example, the data transfer rate of sensor data 126 comprising image data from a camera 344 to a first processor 118(1) may be limited, while a data transfer rate of distance data from an ultrasonic sensor 318 to a second processor 118(2) may be unchanged. Continuing the example, the overall data transfer rate of all sensor data 126 may be reduced, but this reduction may be specific to particular sensors 124, processors 118, and so forth.

The constraint applied to the data transfer rate by the thermal management module 136 may be exceeded in some circumstances. In some implementations, if the AMD 104 determines the presence of a moving object, the data transfer rate may be increased. For example, if a user moves in front of the AMD 104 while it is moving autonomously, the AMD 104 may increase the data transfer rate to acquire and process more information more quickly. This excursion to a higher data transfer rate may occur only while the moving object is detected, for a particular time after detecting the moving object, until the second location 106(2) is reached, until another command is received, and so forth. If the device temperature 112 rises due to the increased production in heat by the one or more processors 118, the limitation on the data transfer rate may be reasserted.

At 710 the AMD 104 moves at less than or equal to the first speed. The AMD 104 maintains responsiveness to obstacles in the physical space 102 while reducing the heat produced by the one or more processors 118, and so forth.

Various techniques may be used individually or in combination to reduce the data transfer rate. As described above, the reduction in data transfer rate may be a reduction in data transferred to the processor 118, data processed by one or more cores of the processor 118, or a combination thereof. Some techniques for limiting data transfer from one or more sensors 124 are described with regard to 712-720.

At 712 a data acquisition rate or sample rate of one or more sensors 124 may be changed. For example, an image sensor of a camera 344 may be configured to provide sensor data 126 comprising image data at a frame rate indicated by a specified number of frames per second (FPS). Continuing the example, electronics associated with the camera 344 may be set to deliver image data with a frame rate of 15 FPS rather than 30 FPS.

At 714 at least a portion of the sensor data 126 may be discarded or disregarded. For example, the camera 344 may continue to generate sensor data 126 comprising image data at 30 FPS, but every nth frame (where n is a nonzero integer value) may be discarded or disregarded. Continuing the example, half of the frames would be dropped, resulting in an effective frame rate of 15 FPS. Discarding may include, but is not limited to, deletion of data, removal of a pointer to data, changing a pointer to data to a null value, not storing data, and so forth.

At 716 a subset of data from the one or more sensors 124 is selected. The selected data may be sent to the one or more processors 118 or processed by one or more cores of the processor 118. The selection of data may comprise determining a portion of sensor data 126. In one implementation, if the sensor data 126 comprises image data from the camera 344, a subset may comprise a portion of an image. For example, the image data from the camera 344 may have a resolution of 1920×1080 pixels, and may be cropped to 640×768 pixels, reducing the overall size of the image data.

At 718 a resolution, bit depth, or other attribute of the sensor data 126 produced by one or more sensors 124 may be changed from a first value to a second value, wherein the second value is less than the first value. For example, the first value may indicate first resolution of an image of 1920×1080 pixels and the second value may indicate a second resolution of an image of 1280×960 pixels. In another example, the bit depth may be changed, such as from 14 bits of color depth to 10 bits of color depth.

At 720 one or more sensors 124 are deactivated. The deactivation may comprise one or more of placing the sensor 124 into a low power mode, turning the sensor 124 off, and so forth. In some situations one or more sensors 124 may be redundant or unnecessary. For example, at a very low speed the ultrasonic sensors 318 may be turned off.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
a camera;
one or more motors coupled to one or more wheels;
one or more memories storing first computer-executable instructions;
a temperature sensor; and
one or more processors to execute the first computer-executable instructions to:
determine, using the temperature sensor, a first temperature at a first time;
determine a first location of the robot at the first time;
determine a second location comprising a destination for the robot;
determine a first path from the first location to the second location;
determine a first path plan based on the first path, the first path plan indicative of the robot traversing a first portion of the first path at a first speed for a first length of time;
determine a first data transfer rate based at least in part on the first speed;
determine a first predicted temperature of the robot upon arrival at the second location based at least in part on the first temperature, the first path plan, and the first data transfer rate;
determine the first predicted temperature exceeds a threshold value;
determine a second path plan based on the first path, the second path plan indicative of the robot traversing the first portion of the first path at a second speed that is less than the first speed;
determine a second data transfer rate based at least in part on the second speed, wherein the second data transfer rate is less than the first data transfer rate;
determine a second predicted temperature of the robot upon arrival at the second location based at least in part on the first temperature, the second path plan, and the second data transfer rate;
determine the second predicted temperature is less than or equal to the threshold value;
move the robot using the second path plan; and
limit transfer of data from the camera to the one or more processors to less than or equal to the second data transfer rate.

2. A method performed at least in part by an autonomous mobile device (AMD), the method comprising:
determining a first temperature associated with a portion of the AMD;
determining a first location of the AMD in a physical space;
determining a second location in the physical space;
determining an occupancy map of the physical space;
determining a first data transfer rate based at least in part on the first temperature;
determining a first speed based on the first data transfer rate;
determining, based at least in part on the first temperature and the occupancy map, a first path plan indicative of a first path from the first location to the second location, wherein the first path plan specifies that the AMD traverses the first path at a maximum speed that is less than or equal to the first speed; and
transferring, during traversing of at least a portion of the first path, first data from one or more sensors to one or more processors within the AMD at a rate less than or equal to the first data transfer rate.

3. The method of claim 2, further comprising:
determining, based at least in part on the first temperature and the first path plan, a first predicted temperature associated with the portion of the AMD upon arrival at the second location; and
wherein the first predicted temperature is less than a threshold value.

4. The method of claim 2, wherein the first path plan comprises:
information indicating that the AMD is to traverse a first portion of the first path at the first speed;
information indicating that the AMD is to traverse a second portion of the first path at a second speed that is less than the first speed; and
wherein transferring the first data further comprises:
transferring the first data from the one or more sensors to the one or more processors at less than or equal to the first data transfer rate during the first portion of the first path; and
transferring second data from the one or more sensors to the one or more processors at a second data transfer rate during the second portion of the first path, wherein the second data transfer rate is less than the first data transfer rate.

5. The method of claim 2, further comprising:
moving the AMD along at least a portion of the first path;
determining a second temperature associated with the portion of the AMD at a third location in the at least portion of the first path;

determining that the second temperature exceeds a threshold value;
determining, based at least in part on the second temperature, a second speed;
limiting speed of the AMD to less than or equal to the second speed; and
limiting data transfer within the AMD based at least in part on the second speed.

6. The method of claim 2, further comprising:
moving the AMD along at least a portion of the first path;
determining a second temperature associated with the portion of the AMD at a third location in the at least portion of the first path;
determining the second temperature exceeds a threshold value;
determining, based at least in part on the second temperature, a second data transfer rate from the one or more sensors to the one or more processors;
limiting data transfer from the one or more sensors to the one or more processors to the second data transfer rate;
determining, based at least in part on the second data transfer rate, a second speed; and
limiting speed of the AMD to less than or equal to the second speed.

7. The method of claim 2,
wherein determining the first path plan comprises determining the first path such that an average speed of the AMD along the first path is less than the first speed.

8. The method of claim 2, further comprising:
limiting data transfer within the AMD to the first data transfer rate, the limiting comprising one or more of:
changing a frame rate of an image sensor from a first frame rate to a second frame rate, wherein the second frame rate is less than the first frame rate,
discarding at least a portion of data from the one or more sensors,
selecting a subset of data from the one or more sensors to send to the one or more processors,
changing resolution of the one or more sensors from a first resolution to a second resolution, wherein the second resolution is less than the first resolution, or
deactivating one or more of the one or more sensors.

9. The method of claim 2, the determining the first path plan comprising:
determining a first candidate path from the first location to the second location;
determining a first candidate path plan based on the first candidate path comprising information indicating that the AMD is to traverse a first portion of the first candidate path at the first speed for a first length of time;
determining a first predicted temperature of the AMD upon arrival at the second location based at least in part on the first temperature and the first candidate path plan;
determining a second candidate path from the first location to the second location;
determining a second candidate path plan based on the second candidate path comprising information indicating that the AMD is to traverse a second portion of the second candidate path at a second speed;
determining a second predicted temperature of the AMD upon arrival at the second location based at least in part on the first temperature and the second candidate path plan;
determining the second predicted temperature is less than the first predicted temperature; and
selecting the second candidate path plan.

10. The method of claim 2, further comprising:
determining a temperature map of the physical space that is indicative of historical temperature data of the physical space; and
wherein the determining the first path plan is based at least in part on the temperature map.

11. The method of claim 2, further comprising:
determining a first task associated with the second location;
determining a second temperature associated with performance of the first task; and
wherein determining the first path plan is further based at least in part on the second temperature such that a difference between a temperature threshold value and a predicted temperature of the AMD upon arrival at the second location is less than or equal to the second temperature.

12. The method of claim 2, further comprising:
moving the AMD along at least a portion of the first path;
determining, at a first time, absence of moving objects;
transferring data internally within the AMD at the first data transfer rate;
determining, based at least in part on the first data transfer rate, a second speed;
limiting a speed of the AMD to less than or equal to the second speed;
detecting, at a second time, at least one moving object; and
transferring data internally within the AMD at a second data transfer rate, wherein the second data transfer rate is greater than the first data transfer rate.

13. A device comprising:
one or more motors;
one or more sensors including a temperature sensor;
one or more memories storing first computer-executable instructions; and
one or more processors to execute the first computer-executable instructions to:
determine a first temperature associated with a portion of the device;
determine a first location of the device in a physical space;
determine a second location of the device in the physical space;
determine an occupancy map of the physical space;
determine a first data transfer rate based at least in part on the first temperature;
determine a first speed based on the first data transfer rate;
determine, based at least in part on the first temperature and the occupancy map, a first path plan indicative of a first path from the first location to the second location, wherein the first path plan specifies that the device traverses the first path at a maximum speed that is less than or equal to the first speed; and
transfer, during traversing of at least a portion of the first path, first data from the one or more sensors to the one or more processors within the device at less than or equal to the first data transfer rate.

14. The device of claim 13, wherein the first path plan comprises:
information indicating that the device is to traverse a first portion of the first path at the first speed; and
information indicating that the device is to traverse a second portion of the first path at a second speed that is less than the first speed; and the one or more processors to execute the first computer-executable instructions to:
transfer the first data from the one or more sensors to the one or more processors at the first data transfer rate during the first portion of the first path; and
transfer second data from the one or more sensors to the one or more processors at a second data transfer rate during the second portion of the first path, wherein the second data transfer rate is less than the first data transfer rate.

15. The device of claim 13, the one or more processors to execute the first computer-executable instructions to:
determine, during traversing of the at least portion of the first path, a second temperature associated with the portion of the device;
determine that the second temperature exceeds a threshold value;
determine, based at least in part on the second temperature, a second speed;
limit speed of the device to less than or equal to the second speed; and
limit data transfer within the device based at least in part on the second speed.

16. The device of claim 13, the one or more processors to execute the first computer-executable instructions to:
determine, during traversing of at least a portion of the first path, a second temperature associated with the portion of the device;
determine that the second temperature exceeds a threshold value;
determine, based at least in part on the second temperature, a second data transfer rate from the one or more sensors to the one or more processors;
limit data transfer within the device to the second data transfer rate;
determine, based at least in part on the second data transfer rate, a second speed; and
limit speed of the device to less than or equal to the second speed.

17. The device of claim 13, the one or more processors to execute the first computer-executable instructions to:
limit data transfer within the device by one or more computer-executable instructions to:
change a frame rate of an image sensor from a first frame rate to a second frame rate, wherein the second frame rate is less than the first frame rate,
discard at least a portion of data from the one or more sensors,
select a subset of data from the one or more sensors to send to the one or more processors,
change resolution of the one or more sensors from a first resolution to a second resolution, wherein the second resolution is less than the first resolution, or
deactivate one or more of the one or more sensors.

18. The device of claim 13, the one or more processors to execute the first computer-executable instructions to:
determine a first candidate path from the first location to the second location;
determine a first candidate path plan based on the first candidate path comprising information indicating that the device is to traverse a first portion of the first candidate path at the first speed for a first length of time;
determine a first predicted temperature of the device upon arrival at the second location based at least in part on the first temperature and the first candidate path plan;
determine a second candidate path from the first location to the second location;
determine a second candidate path plan based on the second candidate path comprising information indicating that the device is to traverse a second portion of the second candidate path at a second speed;
determine a second predicted temperature of the device upon arrival at the second location based at least in part on the first temperature and the second candidate path plan;
determine the second predicted temperature is less than the first predicted temperature; and
select the second candidate path plan as the first path plan.

19. The device of claim 13, the one or more processors to execute the first computer-executable instructions to:
determine a first task associated with the second location;
determine a second temperature associated with performance of the first task; and
wherein the first path plan is further based at least in part on the second temperature such that a difference between a temperature threshold value and a predicted temperature of the device upon arrival at the second location is less than or equal to the second temperature.

20. The device of claim 13, the one or more processors to execute the first computer-executable instructions to:
determine a first candidate path from the first location to the second location;
determine a first candidate path plan based on the first candidate path comprising:
first information indicating that the device is to traverse a first portion of the first candidate path at the first speed for a first length of time, and
second information indicating ambient temperatures associated with particular locations along the first candidate path within the physical space;
determine a first predicted temperature of the device upon arrival at the second location based at least in part on the first temperature and the first candidate path plan;
determine a second candidate path from the first location to the second location;
determine a second candidate path plan based on the second candidate path comprising:
third information indicating that the device is to traverse a second portion of the second candidate path at a second speed, and
fourth information indicating ambient temperatures associated with particular locations along the second candidate path within the physical space;
determine a second predicted temperature of the device upon arrival at the second location based at least in part on the first temperature and the second candidate path plan;
determine the second predicted temperature is less than the first predicted temperature; and
select the second candidate path plan as the first path plan.

* * * * *